United States Patent Office 3,794,621
Patented Feb. 26, 1974

3,794,621
POLYURETHANE ELASTOMERS PREPARED FROM DIAMINO-BENZOIC ACID ESTERS
Walter Meckel, New Martinsville, W. Va., and Erwin Müller, Leverkusen, Germany, assignors to Bayer Aktiengesellschaft, Leverkusen, Germany
No Drawing. Filed May 20, 1971, Ser. No. 145,480
Claims priority, application Germany, May 27, 1970, P 20 25 900.1
The portion of the term of the patent subsequent to Aug. 1, 1989, has been disclaimed
Int. Cl. C08g 22/16
U.S. Cl. 260—75 NH      4 Claims

ABSTRACT OF THE DISCLOSURE

Polyurethane elastomers and a method for preparing them are provided wherein the polyurethane elastomers have structural units of the formula:

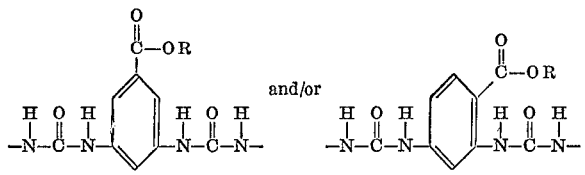

in which R is an alkyl radical containing from about 1 to about 20 carbon atoms which may be branched and which may contain hetero atoms if desired. The polyurethane elastomers of this invention are especially useful in the preparation of moldings which will be subjected to severe mechanical stresses such as, for example, rollers or cone belts.

---

Aromatic diamines have long been known as chain lengthening agents for the production of polyurethane elastomers which contain urea (German patent specification 953,116, U.S. patent specification 3,036,996).

It is also known that polyurethane elastomers which have good properties can be obtained by using e.g. naphthylene-1,5-diisocyanate and glycols as chain lengthening agents and that when using diamines as chain lengthening agents, commercially obtainable toluylene diisocyanate may be used for the production of elastomeric polyurethane resins although in the latter case the mechanical properties are not so good as in the first mentioned polyurethanes. A typical example of an aromatic diamine which is at present much used as a chain lengthening agent is 3,3'-dichloro-4,4'-diamino-diphenylmethane, which yields polyurethane elastomers of average quality.

New polyurethane elastomers have now been found which have excellent elastic properties and good tensile strength.

These polyurethanes have structural units of the formula:

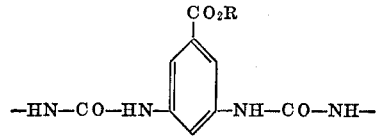

and/or

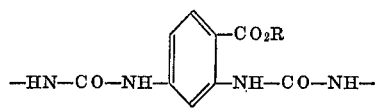

in which R represents an alkyl radical having 1 to 20 carbon atoms which may be branched and/or contain at least one hetero atom.

It is an object of the invention to provide polyurethane elastomers which contain structural units of a formula selected from the group consisting of

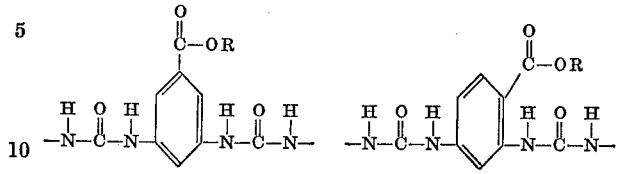

and mixtures thereof in which R is an alkyl radical having from about 1 to about 20 carbon atoms.

Another object of the invention is to provide polyurethane elastomers of the above mentioned formulae in which R is an alkyl radical having from about 1 to about 8 carbon atoms.

A further object of the invention is to provide polyurethane elastomers of the above mentioned formulae in which the alkyl radical is branched.

A further object of the invention is to provide polyurethane elastomers of the above mentioned formulae in which the alkyl radical contains oxygen or sulfur atoms.

It is also an object of the invention to provide a process for the preparation of polyurethane elastomers which comprises reacting an organic polyhydroxy compound having a molecular weight of from about 800 to about 5000 with an organic polyisocyanate and, as a chain extending agent, an aromatic diamine having a formula selected from the group consisting of

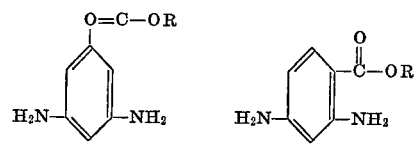

and mixtures thereof wherein R is an alkyl radical having from about one to about 20 carbon atoms.

An additional object of the invention is to provide a process as mentioned wherein the alkyl radical of the aromatic diamine contains oxygen or sulfur atoms.

It is also an object of the invention to provide a process as already mentioned in which the polyisocyanate is reacted with the polyhydroxy compound and the chain extender at a molar ratio of 0.9 to 1.5, and the molar ratio of the reactive hydrogen atoms in the chain lengthening agent to the OH groups in the polyhydroxy compound is between 0.5 and 1.5.

The following are examples of chain lengthening agents which may be used in the process according to the invention:

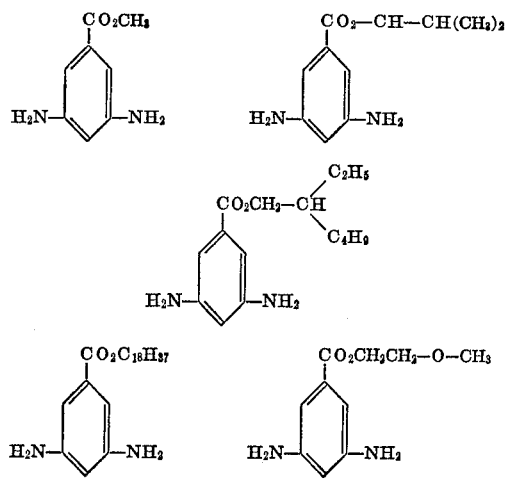

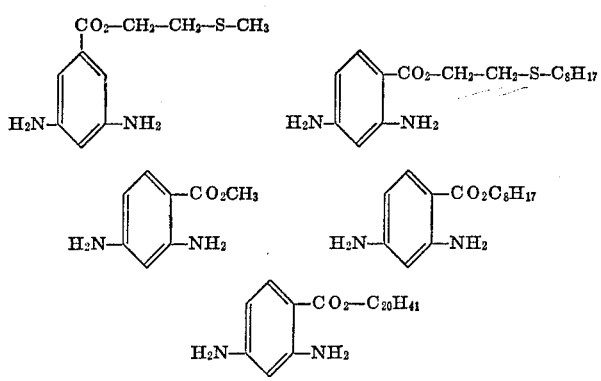

Diamines which have the following formulae are preferred:

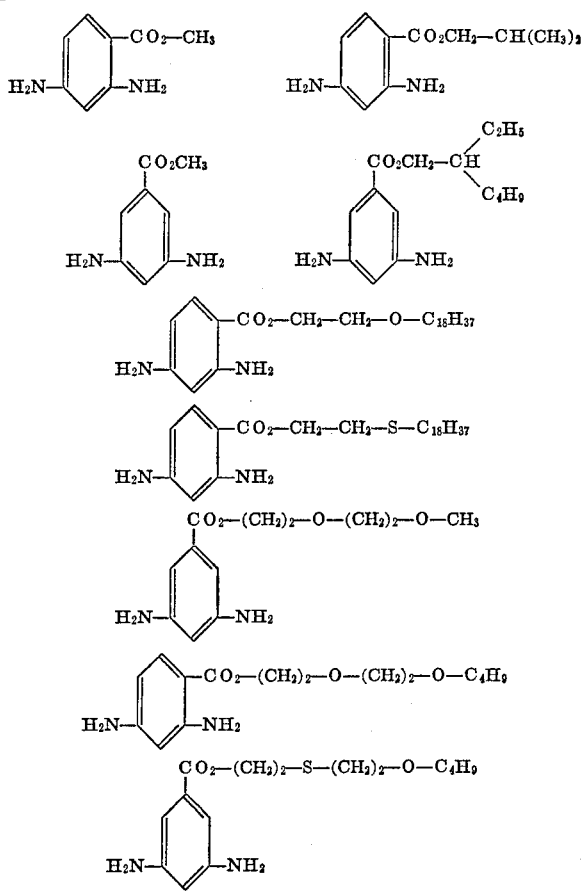

It is especially advantageous to use a mixture of low molecular weight glycols with the aromatic diamine as a chain lengthening agent. The proportion of low molecular weight glycols may be from 0 to 50 mol percent and is preferably 0 to 20 mol percent.

The conventional glycols having molecular weights of up to 500 may be used, especially butane-1,4-diol.

The fact that the chain lengthening agents according to the invention can be used is all the more surprising since in the past only aromatic diamines which contain chlorine could be used for the production of polyurethane elastomers in the casting process. The conventional diamines which were free from chlorine were found to be too reactive to be used as chain lengthening agents.

The amines used according to the invention are prepared by known methods, for example 3,5- or 2,4-dinitrobenzoic acid is esterified and the resulting dinitrobenzoic acid ester is reduced catalytically with Raney nickel or with iron.

The yields are generally between 80 and 95%. The amines obtained are crystalline or oily products, the melting point depending to a large extent on the alkyl radical.

Suitable starting materials for the polyurethanes according to the invention are the conventional polyhydroxyl compounds with molecular weights of 800 to 5000, for example linear or slightly branched polyesters which have terminal hydroxyl groups, e.g. those which can be prepared by known methods from monofunctional or polyfunctional alcohols and carboxylic acids or hydroxycarboxylic acids, optionally with the addition of amino alcohols, diamines, hydroxylamines and diamino alcohols. These polyesters may also contain double or triple bonds of unsaturated fatty acids. Linear or slightly branched polyethers of the type which can be obtained by the polymerization of alkylene oxides such as ethylene oxide, propylene oxide, epichlorohydrin or tetrahydrofuran may also be used. Copolymers of this type are also suitable as are also linear or branched addition products of the above-mentioned alkylene oxides e.g. to polyfunctional alcohols, amino alcohols or amines. The following are mentioned as examples of polyfunctional starting components for the addition of the alkylene oxides: Ethylene glycol, 1,2-propylene glycol, hexane-1,6-diol, ethanolamine and ethylene diamine; a certain amount of trifunctional starting components such as trimethylol propane, glycerol, sorbitol or cane sugar may also be used. Useful diols which can be applied according to the invention are those as listed in U.S. Pat. 3,201,372. One may, of course, also use mixtures of linear and/or slightly branched polyalkylene glycol ethers of various types.

Polyacetals, polythioethers or polycarbonates as well as mixtures of various compounds which have at least two OH groups and a molecular weight of from 800 to 5000 may also be used. It is often preferable to use exclusively or predominently difunctional hydroxyl compounds. Compounds which have at least two OH groups and a molecular weight of from 800 to 5000 can be used according to the invention, which are e.g. disclosed in U.S. Pat. 3,201,372.

Any diisocyanates may be used as the starting material for producing the polyurethane elastomers according to the invention, e.g. aliphatic diisocyanates such as ethylene diisocyanate, butane-1,4-diisocyanate, hexane-1,6-diisocyanate, octomethylene-1,8-diisocyanate, carboxylic acid ester diisocyanates, cycloaliphatic diisocyanates such as 1-methylcyclohexane-2,4- and -2,6-diisocyanate and any mixtures of these isomers, cyclohexane-1,4- and -1,3-diisocyanate, dicyclohexylmethane-4,4'-diisocyanate, isophorone diisocyanate, araliphatic diisocyanates such as xylylene-1,3- and -1,4-xylylene diisocyanate and aromatic diisocyanates such as toluylene-1,4- and -2,6-diisocyanate and any mixtures of these isomers, phenylene-1,3- and -1,4-diisocyanate, diphenylmethane-4,4'-diisocyanate and naphthylene-1,5-diisocyanate; a certain amount of triisocyanates such as benzene-1,3,5-triisocyanate or triphenylmethane-4,4'4''-triisocyanate may also be used. According to the invention, toluylene-2,4- and -2,6-diisocyanate and its isomeric mixtures, diphenylmethane-4,4'-diisocyanate and naphthylene-1,5-diisocyanate are preferred. The reaction product of 2 mols of a diisocyanate with 1 mol of a low molecular weight branched or unbranched diol may also advantageously be used as the diisocyanate; a certain amount of a triol may be added to these diisocyanates, especially in cases where higher NCO values are desired in the prepolymer. Isocyanates which can be used according to the invention are those as disclosed in U.S. Pat. 3,350,362.

The quantities of the reactants are generally so chosen that the molar ratio of the diisocyanates to the chain lengthening agent plus the polyhydroxy compound which depends on the working up process used, is from 0.9 to 1.5, preferably from 1.05 to 1.25. In cases where the process is carried out via a prepolymer stage, the percentages of NCO in the prepolymer may be between 1 and 6%. The molar ratio of the reactive hydrogen in the chain lengthening agent to the reactive OH groups may vary within wide limits and is preferably between 0.4 and 1.5, the resulting products varying from soft to hard. The molecular proportion of the amine in the chain lengthening agent should be between 1 and 0.5 and preferably between 1 and 0.8.

The process according to the invention may be carried out in various ways. Thus, for example, the compound which has at least two hydroxyl groups may be reacted with an excess of the diisocyanate and the melt poured into moulds after the addition of a chain lengthening agent. After several hours' heat treatment, a high grade elastic polyurethane resin is obtained.

Another method consists in reacting a mixture of the compound which has at least two hydroxyl groups and the chain lengthening agent used according to the invention with an excess of the diisocyanate and then moulding the reaction product under pressure and at an elevated temperature after it has been granulated. Polyurethane resins with various degrees of hardness and different types of elasticity can be obtained by this method according to the proportions of reactants used. Synthetic resins which can be processed like thermoplasts are obtained by this method. Another method consists in reacting a mixture of the higher molecular weight compound which has at least two hydroxyl groups and the chain lengthening agent to be used according to the invention with an excess of the diisocyanate, a rollable sheet being obtained which can then be converted into a rubbery elastic polyurethane resin in a following stage, e.g. by cross-linking it with another diisocyanate.

The products according to the invention have a wide range of application for mouldings which are subjected to severe mechanical stresses, such as rollers or cone belts. They can be modified by the usual additives.

(A) PREPARATION OF THE STARTING MATERIAL

Methyl 3,5-diaminobenzoate 1.4 kg. of 3,5-dinitrobenzoic acid are suspended in 3 l. of methanol. 50 g. of gaseous hydrogen chloride are introduced and esterification is completed by boiling under reflux for 12 hours.

1369 g. (95% of the theory) crystallize on cooling and melt at 107° C. to 110° C.

1300 g. of methyl 3,5-dinitrobenzoate are hydrogenated in 7000 ml. of methanol and 200 g. of Raney nickel. The catalyst is removed. 830 g. (88% of the theory) of methyl 3,5-diaminobenzoate of melting point 133° C. to 135° C. crystallize on cooling.

The following esters are obtained in an analogous manner:

Isobutyl 3,5-diaminobenzoate.—Melting point 71° C.–72° C.

(2-ethyl) hexyl 3,5-diaminobenzoate.—Melting point 38° C.–42° C.

Stearyl 3,5-diaminobenzoate.—Melting point 75° C.–77° C.

Methyl 2,4-diaminobenzoate.—1 kg. of 2,4-dinitrobenzoic acid in 3 l. of methanol and 50 g. of gaseous hydrogen chloride are heated under reflux for 6 hours.

The methyl ester formed is isolated by suction filtration at a reduced pressure and recrystallized from methanol.

500 g. of methyl 2,4-dinitrobenzoate are reduced in 2 l. of methanol with Raney nickel and hydrogen. The hot reduction solution is separated from the catalyst, and methyl 2,4-diaminobenzoate is recrystallized from benzene. Melting point: 112° C. Yield: 88% of the theory.

(B) PROCESS ACCORDING TO THE INVENTION

Example 1

200 g. of a polyester of adipic acid and ethylene glycol (OH number 56) are reacted with 31.8 g. of a mixture of 80% of 2,4- and 20% of 2,6-toluylene diisocyanate at 100° C. for 30 minutes. 10.1 g. of methyl 3,5-diaminobenzoate are then added in molten form at 100° C. The melt is homogenized for 15 seconds and then poured into preheated molds. Polyurethanes which have the following physical properties are obtained after heating for 24 hours at 100° C.:

Tensile strength (DIN 53504) _____kg. wt./cm.² __ 249
Elongation at break (DIN 53504) _____percent__ 595
Structural strength _____kg. wt__ 49
Shore hardness A (DIN 53505) _____° C__ 75
Elasticity (DIN 53512) _____percent__ 39

Examples 2–3

The following elastomers are obtained in a manner analogous to Example 1 from 12.7 g. of isobutyl 3,5-diaminobenzoate and from 15.5 g. of (2-ethyl)-hexyl 3,5-diaminobenzoate:

| | Example 2 | Example 3 |
|---|---|---|
| Tensile strength (DIN 53504) (kg. wt./cm.²) | 260 | 237 |
| Elongation at break (DIN 53504) (percent) | 613 | 629 |
| Structural strength (kg. wt.) | 46 | 45 |
| Shore hardness A (DIN 53505) | 74 | 73 |
| Elasticity (DIN 53512) (percent) | 38 | 37 |

Example 4

200 g. of a polyester of adipic acid and ethylene glycol (OH number 56) are reacted with 38.6 g. of hexamethylene-1,6-diisocyanate at 130° C. After 30 minutes, 16.6 g. of methyl 3,5-diaminobenzoate in the form of a melt are added with stirring. After 20 seconds, the melt is poured into a preheated mould where it is heated at 100° C. for 24 hours.

Tensile strength (DIN 53504) _____kg. wt./cm.² __ 260
Elongation at break (DIN 53504) _____percent__ 685
Structural strength _____kg. wt__ 42
Shore hardness A (DIN 53505) _____° C__ 73
Elasticity (DIN 53512) _____percent__ 41

Example 5

200 g. of a prepolymer prepared from 25.28 kg. of a polyester of adipic acid and ethylene glycol (OH number 56) and 4.66 kg. of 2,4-toluylene diisocyanate are reacted with a mixture of 10.8 g. of methyl 3,5-diaminobenzoate and 1.46 g. of butane-1,4-diol at 100° C.

The melt is poured into preheated moulds and heated for 24 hours at 100° C.

Example 6

Polyurethanes having the properties shown in the following table are obtained in a manner analogous to Example 5 from a mixture of 5.4 g. of methyl 3,5-diaminobenzoate and 2.92 g. of butane-1,4-diol:

| | Example 5 | Example 6 |
|---|---|---|
| Tensile strength (DIN 53504) (kg. wt./cm.²) | 243 | 219 |
| Elongation at break (DIN 53504) (percent) | 628 | 625 |
| Structural strength (kg. wt.) | 36 | 23 |
| Shore hardness A (DIN 53505) | 83 | 68 |
| Elasticity (DIN 53512) (percent) | 38 | 35 |

Example 7

200 g. of a polyester of adipic acid and ethylene glycol (OH number 56) are dehydrated at 130° C. for 15 minutes. 40 g. of a mixture of 80% by weight of 2,4- and 20% by weight of 2,6-toluylene diisocyanate are then added, the temperature rising to 135° C. 16.6 g. of methyl 2,4-diaminobenzoate are then added in the form of a melt in the course of 30 minutes, and after 20 hours the mixture is introduced into a preheated mould where it is heated at 100° C. for 24 hours. A polyurethane which has the properties shown in the table of Example 8 is obtained.

Example 8

The procedure is analogous to that used in Example 7 but 57 g. of 4,4'-diisocyanatodiphenylmethane are used instead of the toluylene diisocyanate. A polyurethane which has the properties shown in the following table is obtained:

| | Example 7 | Example 8 |
|---|---|---|
| Tensile strength (DIN 53504) (kg. wt./cm.²) | 173 | 222 |
| Elongation at break (DIN 53504) (percent) | 612 | 562 |
| Elongation 1 minute after tearing (percent) | 4 | 3 |
| Ring structure (kg. wt.) | 39 | 38 |
| Shore hardness A (DIN 53505) (° C.) | 59 | 61 |
| Elasticity (DIN 53512) (percent) | 21 | 12 |

What is claimed is:

1. Polyurethane elastomers which contain structural units of a formula selected from the group consisting of:

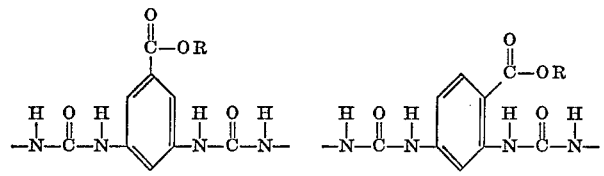

and mixtures thereof in which R is an alkyl radical having from about 1 to about 20 carbon atoms.

2. The polyurethane elastomers of claim 1 in which R is an alkyl radical having from about 1 to about 8 carbon atoms.

3. The polyurethane elastomers of claim 1 in which the alkyl radical is branched.

4. The polyurethane elastomers of claim 1 which the alkyl radical contains oxygen or sulfur atoms.

References Cited

UNITED STATES PATENTS

| | | | |
|---|---|---|---|
| 3,428,610 | 2/1969 | Klebert | 260—75 |
| 3,681,290 | 8/1972 | Meckel et al. | 260—77.5 AM |
| 3,456,037 | 8/1969 | Hoeschlle | 260—858 |
| 3,194,793 | 7/1965 | Kogon | 260—77.5 |

FOREIGN PATENTS

| | | | |
|---|---|---|---|
| 79,320 | 12/1965 | Japan | 260—471 R |
| 779,500 | 7/1957 | Great Britain | 260—471 R |

DONALD E. CZAJA, Primary Examiner

H. S. COCKERAM, Assistant Examiner

U.S. Cl. X.R.

260—77.5 AM

Notice of Adverse Decision in Interference

In Interference No. 99,043, involving Patent No. 3,794,621, W. Meckel and E. Muller, POLYURETHANE ELASTOMERS PREPARED FROM DI-AMINO-BENZOIC ACID ESTERS, final judgment adverse to the patentees was rendered Feb. 4, 1977, as to claim 1.

[*Official Gazette May 3, 1977.*]